US012637210B2

(12) United States Patent
Bower

(10) Patent No.: US 12,637,210 B2
(45) Date of Patent: *May 26, 2026

(54) FLYING WING VERTICAL TAKE-OFF AND LANDING AIRCRAFT

(71) Applicant: Archer Aviation Inc., San Jose, CA (US)

(72) Inventor: Geoffrey C. Bower, Sunnyvale, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,901

(22) Filed: Feb. 16, 2024

(65) Prior Publication Data

US 2025/0187728 A1 Jun. 12, 2025

Related U.S. Application Data

(63) Continuation of application No. 17/340,811, filed on Jun. 7, 2021, now Pat. No. 11,905,007.

(51) Int. Cl.
| | |
|---|---|
| *B64C 29/00* | (2006.01) |
| *B64C 23/06* | (2006.01) |
| *B64C 39/10* | (2006.01) |
| *B64D 27/24* | (2006.01) |
| *B64D 27/34* | (2024.01) |

(Continued)

(52) U.S. Cl.
CPC ........ *B64C 29/0033* (2013.01); *B64C 23/069* (2017.05); *B64C 39/10* (2013.01); *B64D 27/24* (2013.01); *B64D 27/34* (2024.01); *B64D 27/357* (2024.01); *B64D 31/16* (2024.01)

(58) Field of Classification Search
CPC .............. B64C 29/0033; B64C 23/069; B64C 39/10; B64D 27/24
See application file for complete search history.

(56) References Cited

U.S. PATENT DOCUMENTS

| | | | |
|---|---|---|---|
| 9,694,911 B2 | 7/2017 | Bevirt et al. | |
| 10,407,151 B2 * | 9/2019 | Cazals ................... | B64C 1/1423 |

(Continued)

FOREIGN PATENT DOCUMENTS

| CN | 109911194 A | 6/2019 |
|---|---|---|

OTHER PUBLICATIONS

Bower, U.S. Office Action mailed Sep. 1, 2023, directed to U.S. Appl. No. 17/340,811; 16 pages.

(Continued)

*Primary Examiner* — Assres H Woldemaryam
(74) *Attorney, Agent, or Firm* — Finnegan, Henderson, Farabow, Garrett & Dunner, LLP

(57) ABSTRACT

A passenger vertical take-off and landing aircraft includes a flying wing comprising a passenger compartment, a first set of rotors positioned at least partially forward of a leading edge of the flying wing, and a second set of rotors positioned at least partially rearward of a trailing edge of the flying wing. The first set of rotors may include at least four rotors and the second set of rotors may comprise at least two rotors. The first set of rotors, the second set of rotors, both, or neither may be tiltable between lift configurations for providing lift for vertical take-off and landing of the aircraft and propulsion configurations for providing forward thrust to the aircraft.

41 Claims, 6 Drawing Sheets

(51) Int. Cl.
    *B64D 27/357*      (2024.01)
    *B64D 31/16*      (2024.01)

(56) References Cited

U.S. PATENT DOCUMENTS

| | | | | |
|---|---|---|---|---|
| 11,077,937 | B1 * | 8/2021 | Bruell | .................... B64C 11/001 |
| 11,511,854 | B2 * | 11/2022 | Baity | .................... B64U 30/297 |
| 2013/0092799 | A1 | 4/2013 | Tian et al. | |
| 2018/0002014 | A1 | 1/2018 | McCullough et al. | |
| 2018/0244383 | A1 | 8/2018 | Valente et al. | |
| 2018/0290736 | A1 | 10/2018 | Mikic et al. | |
| 2018/0305005 | A1 | 10/2018 | Parks et al. | |
| 2018/0334254 | A1 * | 11/2018 | Saint-Marc | .......... B64D 11/003 |
| 2019/0329882 | A1 | 10/2019 | Baity et al. | |
| 2020/0148347 | A1 * | 5/2020 | Bevirt | ..................... B64D 27/31 |
| 2020/0207476 | A1 * | 7/2020 | Whitlock | .................. B64C 1/10 |
| 2021/0245873 | A1 * | 8/2021 | Tighe | ..................... B64D 27/24 |
| 2021/0300527 | A1 * | 9/2021 | Thalheimer | ......... B64C 29/0033 |
| 2022/0204154 | A1 * | 6/2022 | Roe | ..................... B64C 29/0033 |
| 2022/0306292 | A1 * | 9/2022 | Ross | ....................... B64C 39/08 |
| 2022/0324558 | A1 * | 10/2022 | Ross | ..................... B64D 27/33 |
| 2023/0150659 | A1 * | 5/2023 | Ivans | .................... B64U 50/19 |
| | | | | 244/12.4 |

OTHER PUBLICATIONS

Bower, U.S. Office Action mailed Apr. 5, 2023, directed to U.S. Appl. No. 17/340,811; 13 pages.

Bower, U.S. Office Action mailed Dec. 23, 2022, directed to U.S. Appl. No. 17/340,811; 11 pages.

International Search Report and Written Opinion dated Aug. 17, 2022, directed to International Application No. PCT/US2022/072778; 15 pages.

SUAS News. (Feb. 15, 2017) "UAVenture and Flyingwings Release RTF VTOL-Falcon Vertigo," located at https://www.suasnews.com/2017/02/falcon-vertigo/. (2 pages).

Vertical Technologies. "Explore the DeltaQuad Pro VTOL UAV," located at www.deltaquad.com, visited on Oct. 28, 2021. 4 pages.

Wingtra. "WingtraOne Gen II," located at www.wingtra.com/mapping-drone-wingtraone/, visited on Oct. 28, 2021. 12 pages.

* cited by examiner

FLYING WING VERTICAL TAKE-OFF AND LANDING AIRCRAFT

CROSS-REFERENCE TO RELATED APPLICATION

This application is a continuation of U.S. application Ser. No. 17/340,811, filed Jun. 7, 2021, the entire contents of which is incorporated herein by reference.

FIELD

This disclosure generally relates to vertical take-off and landing aircraft, and more specifically to flying wing vertical take-off and landing aircraft.

BACKGROUND

Vertical take-off and landing (VTOL) aircraft are aircraft that can take-off and land vertically and hover, providing the ability to carry travelers directly to their destination. Some VTOL aircraft have wings and propulsion systems that enable the wings to provide the lift required during forward flight. Some winged VTOL aircraft use separate propulsion systems for vertical thrust for use during take-off and landing and forward thrust for use during cruising. Other winged VTOL aircraft use tiltable propulsion systems that tilt between vertical thrust and forward thrust positions. Moreover, some winged VTOL aircraft have a fixed wing configuration in which the aircraft includes separate fuselage, wing, and tail surfaces. Other winged VTOL aircraft have a flying wing configuration in which components are integrated into a single blended wing.

SUMMARY

Some known passenger VTOL aircraft have a fixed wing configuration. However, the performance of VTOL aircraft is largely dictated by empty weight fraction—defined as any weight that is not part of a payload or batteries—and lift-to-drag ratio. Performance of VTOL aircraft that have a fixed wing configuration is limited because such aircraft are often designed with more components than is necessary. These aircraft have an empty weight fraction that is often around 60% of the maximum takeoff weight and can have a lift-to-drag ratio in the low teens.

Flying wing VTOL configurations have been limited to unmanned drone configurations. A flying wing configuration is an aircraft configuration that doesn't include a tail section and some or all of the fuselage is housed inside of the wing structure. By combing these sections the empty weight fraction may be improved. Additionally, known VTOL aircraft that have flying wing configurations with rotors attached to the flying wing are unmanned drone aircraft systems such as simple quadrotor flying wing aircraft that have fixed rotors or tailsitter flying wing aircraft. These unmanned aircraft systems are not designed to carry passengers and are, therefore, not sized and designed to allow for passengers to enter and exit the aircraft.

Accordingly, described herein is a flying wing passenger VTOL aircraft that includes (1) a passenger compartment, and (2) a plurality of rotors for providing lift during vertical take-off and landing and/or forward thrust during cruise. The aircraft configuration includes a passenger compartment that is configured to allow passengers to be forward facing during takeoff and landing. The aircraft includes at least four rotors positioned at least partially forward of a leading edge of the flying wing and at least two rotors positioned at least partially rearward of a trailing edge of the flying wing. Compared to a fixed wing configuration VTOL aircraft in which the aircraft includes separate fuselage, wing, and tail surfaces, the described flying wing configuration VTOL aircrafts in which components are integrated into a single blended wing may be more lightweight, have less wetted surface area and therefore less drag, and/or have a smaller ground footprint as compared to traditional passenger VTOL aircraft.

In some embodiments, a flying wing passenger vertical take-off and landing aircraft includes a flying wing comprising a passenger compartment, at least four rotors positioned at least partially forward of a leading edge of the flying wing, and at least two rotors positioned at least partially rearward of a trailing edge of the flying wing.

In some embodiments, the passenger compartment is configured to allow passengers to be forward facing during takeoff and landing. In some embodiments, each of the at least four rotors positioned at least partially forward of the leading edge of the flying wing is a tilt rotor configured to be tiltable between lift configurations for providing lift for vertical take-off and landing of the aircraft and propulsion configurations for providing forward thrust to the aircraft. In some embodiments, each of the at least two rotors positioned at least partially rearward of the trailing edge of the flying wing is configured to provide lift for vertical take-off and landing of the aircraft. In some embodiments, each of the at least two rotors positioned at least partially rearward of the trailing edge of the flying wing is a tilt rotor configured to be tiltable between lift configurations for providing lift for vertical take-off and landing of the aircraft and propulsion configurations for providing forward thrust to the aircraft.

In some embodiments, the aircraft includes a control system configured to independently alter a tilt of at least one of the at least four rotors positioned at least partially forward of the leading edge of the flying wing, a tilt of at least one of the at least two rotors positioned at least partially rearward of the trailing edge of the flying wing, or both.

In some embodiments, each of the at least four rotors positioned at least partially forward of the leading edge of the flying wing is configured to provide lift for vertical take-off and landing of the aircraft, each of the at least two rotors positioned at least partially rearward of the trailing edge of the flying wing is configured to provide lift for vertical take-off and landing of the aircraft, and the aircraft comprises a pusher motor positioned at least partially rearward of a center section of the trailing edge of the flying wing to provide forward thrust to the aircraft.

In some embodiments, the aircraft includes a plurality of booms mounted to the flying wing. In some embodiments, the plurality of booms includes a first plurality of booms and a second plurality of booms, wherein each of the first plurality of booms mounts one of the at least four rotors positioned at least partially forward of the leading edge of the flying wing to the flying wing, and wherein each of the second plurality of booms mounts one of the at least four rotors positioned at least partially forward of the leading edge of the flying wing and one of the at least two rotors positioned at least partially rearward of the trailing edge of the flying wing to the flying wing.

In some embodiments, the aircraft includes a greater number of rotors positioned at least partially forward of the leading edge of the flying wing than rotors positioned at least partially rearward of the trailing edge of the flying wing.

In some embodiments, a first rotor of the aircraft is canted relative to a second rotor of the aircraft such that a rotational axis of the first rotor is non-parallel with a rotational axis of the second rotor. In some embodiments, a sweep angle of the flying wing is at least 20 degrees. In some embodiments, the sweep angle of the flying wing is 20 to 40 degrees. In some embodiments, a sum of disc area of the rotors of the aircraft is at least the wing area of the flying wing.

In some embodiments, the aircraft has six rotors. In some embodiments, the aircraft has ten rotors. In some embodiments, aircraft comprises at least one battery, wherein the passenger compartment and the at least one battery are integrated into a center section of the flying wing. In some embodiments, the flying wing comprises winglets. In some embodiments, the aircraft is electrically powered.

In some embodiments, a distance from a leading edge of the wing to each center of each of the at least four rotors positioned at least partially forward of the leading edge of the flying wing is 0.5 to 2 rotor radii. In some embodiments, a distance from a trailing edge of the wing to each center of each of the at least two rotors positioned at least partially rearward of the trailing edge of the flying wing is 0.5 to 2 rotor radii.

BRIEF DESCRIPTION OF THE DRAWINGS

The disclosure will now be described, by way of example only, with reference to the accompanying drawings, in which.

DETAILED DESCRIPTION

Figures 1, 2:
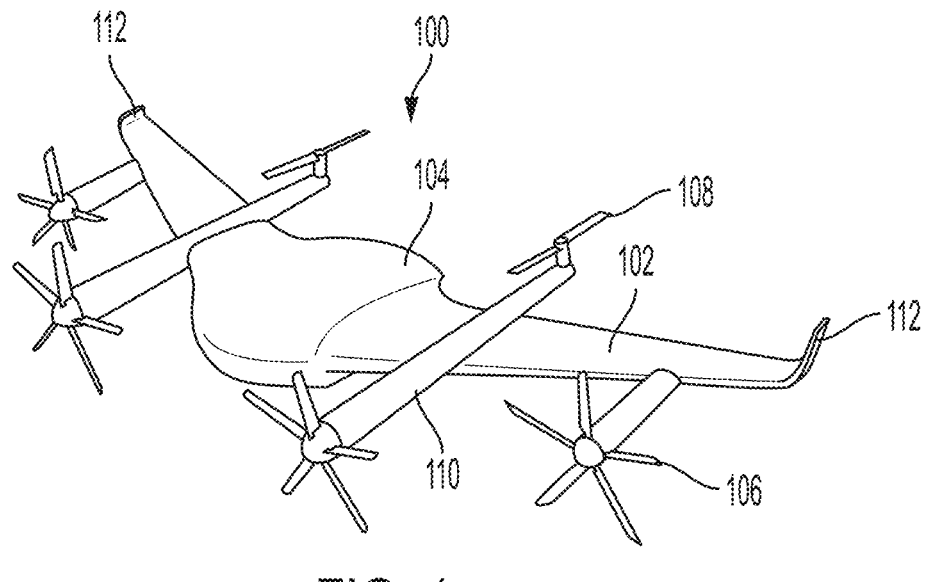
FIG. 1 shows a VTOL aircraft in a cruise configuration, according to some embodiments.
FIG. 2 shows a VTOL aircraft in a takeoff and landing configuration, according to some embodiments.

According to various embodiments, VTOL aircraft described herein include a flying wing which includes a passenger compartment for pilot(s) and/or passenger(s) and a plurality of rotors attached to the flying wing. By configuring the VTOL aircraft to include a flying wing as opposed to a fixed wing and separate fuselage and tail components, unnecessary weight and drag may be removed from the aircraft.

In some embodiments, the plurality of rotors attached to the flying wing includes at least six rotors. In some embodiments, the plurality of rotors attached to the flying wing includes two sets of rotors attached to the flying wing: a first set of rotors mounted forward of a leading edge of the wing and a second set of rotors mounted rearward of a trailing edge of the wing. In some embodiments, the first set of rotors includes at least four rotors and the second set of rotors includes at least two rotors.

In some embodiments, the plurality of rotors attached to the flying wing are configured to provide both lift for vertical take-off and landing and forward thrust during cruise. Each of the first set of rotors and/or each of the second set of rotors may be tiltable between lift configurations for providing lift during vertical take-off and landing and propulsion configurations for providing forward thrust. In some embodiments, configuring the aircraft such that the first set of rotors are tiltable and the second set of rotors are fixed may be advantageous at least to design the aircraft with smaller, lighter weight, and lower drag rotors compared to those rotors which may be included in an aircraft that includes only tiltable rotors. In some embodiments, configuring the aircraft such that all rotors are tiltable may create additional degrees of freedom relative to an aircraft in which a portion of the rotors are fixed. These additional degrees of freedom may be used to generate yawing moments that can be used to control the aircraft during flight and/or to increase redundancy in controlling the propulsion of the aircraft. In some embodiments, a control system is configured to independently control the tilt of each tiltable rotor.

In some embodiments, the plurality of rotors attached to the flying wing are configured to only provide lift for vertical take-off and landing. In these embodiments, the aircraft may include separate lift and propulsion systems. For example, instead of including tiltable rotors, the aircraft may instead include a pusher motor mounted aft of a center section of the flying wing to provide forward thrust.

In some embodiments, each rotor is mounted to the flying wing via a boom. The aircraft may include a plurality of booms, some of which are configured to support one of the first set of rotors at a front end of the boom and others of which are configured to support both one of the first set of rotors at a front end of the boom and one of the second set of rotors at a rear end of the boom. Some of the booms may only support one of the first set of rotors because the aircraft may comprise more rotors mounted forward of the leading edge of the wing than rotors mounted rearward of the trailing edge of the wing. The aircraft may comprise more rotors mounted forward of the leading edge so that the center of gravity of the aircraft is forward of the neutral point of the aircraft.

In some embodiments, the plurality of rotors and the passenger compartment are positioned to maximize passenger safety and comfort. For example, in some embodiments, each rotor is positioned and/or canted relative to the passenger compartment and/or critical systems of the aircraft so that (1) passenger ingress and egress can be achieved quickly and efficiently (e.g., via an aft ramp or leading edge doors), and (2) potential damage resulting from a blade breaking during flight is minimized. Moreover, in some embodiments, each rotor is positioned and/or canted relative to another rotor so that (1) the blades of the rotors do not intersect with one another, and (2) yaw control is enhanced.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well, unless the context clearly indicates otherwise. It is also to be understood that the term "and/or"" as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

FIGS. 1 and 2 illustrate a VTOL aircraft 100 in a cruise configuration and a vertical take-off and landing configuration, respectively, according to various embodiments. Each of FIG. 1 and FIG. 2 show a side view of the aircraft 100 (upper left), an isometric view of the aircraft 100 (upper right), a top-down view of the aircraft 100 (bottom left), and a front view of the aircraft 100 (bottom right). The aircraft 100 includes a flying wing 102 that includes a passenger compartment 104 and curved wing tips 112, a first set of rotors 106 (hereinafter referred to as "forward rotors") mounted forward of a leading edge of the wing 102, a second set of rotors 108 (hereinafter referred to as "aft rotors") mounted rearward of a trailing edge of the wing 102, and a plurality of booms 110 that mount each rotor to the wing 102. The aircraft includes at least four forward rotors and at least two aft rotors. Each rotor is positioned along the wing 102 outwardly of the passenger compartment 104 and inwardly of the wing tips 112.

Because the VTOL aircraft has a flying wing configuration and does not include separate wing, fuselage, and tail components, the aircraft may be lighter in weight, have a smaller wetted surface area and therefore less drag, and may have a smaller ground footprint as compared to a traditional VTOL aircraft. In some embodiments, the span of the aircraft (the distance from one wing tip to another) may be at least 30 feet, at least 35 feet or at least 40 feet. In some embodiments, the span of the aircraft is less than 80 feet, less than 70 feet or less than 60 feet. In some embodiments, the span of the aircraft is 30-80 feet.

In some embodiments, a height of the passenger compartment is at least 4 feet or at least 5 feet. In some embodiments, the height of the passenger compartment is less than 8 feet, or less than 7 feet. In some embodiments, the height of the passenger compartment is 4-8 feet.

In some embodiments, a root chord of the aircraft (the distance from the leading edge of the wing to the trailing edge of the wing) at the aircraft's widest point is at least 10 feet or at least 12 feet. In some embodiments, a root chord of the aircraft at the aircraft's widest point is at less than 25 feet or less than 20 feet. In some embodiments, a root chord of the aircraft at the aircraft's widest point is 10-25 feet.

In some embodiments, a rotor diameter (the diameter of the circle in which the blades of the rotor rotate) of one or more rotors may be at least 6 feet, at least 7 feet or at least 8 feet. In some embodiments, a rotor diameter of one or more rotors may be at less than 12 feet, less than 11 feet or less 10 feet. In some embodiments, a rotor diameter of one or more rotors may be 7-12 feet.

In some embodiments, a sweep angle of the flying wing may be at least 20 degrees or at least 25 degrees. In some embodiments, a sweep angle of the flying wing may be less than 40 degrees or less than 35 degrees. In some embodiments, a sweep angle of the flying wing is 20-40 degrees.

In some embodiments, a distance from a leading edge of the wing to the center of one or more rotors positioned at least partially forward of a leading edge of the flying wing is 0.5 to 2 rotor radii. In some embodiments, the distance from a leading edge of the wing to the center of one or more rotors positioned at least partially forward of a leading edge of the flying wing is at least 0.5 rotor radii or at least 0.8 rotor radii. In some embodiments, the distance from a leading edge of the wing to the center of one or more rotors positioned at least partially forward of a leading edge of the flying wing is less 2 rotor radii or less than 1.5 rotor radii.

In some embodiments, a distance from a trailing edge of the wing to the center of one or more rotors positioned at least partially rearward of a trailing edge of the flying wing is 0.5 to 2 rotor radii. In some embodiments, the distance from a trailing edge of the wing to the center of one or more rotors positioned at least partially rearward of a trailing edge of the flying wing is at least 0.5 rotor radii or at least 0.8 rotor radii. In some embodiments, the distance from a trailing edge of the wing to the center of one or more rotors positioned at least partially rearward of a trailing edge of the flying wing is less 2 rotor radii or less than 1.5 rotor radii.

FIG. 1 shows exemplary dimensions, in which the span of the aircraft is approximately 50 feet, the height of the passenger compartment is approximately 5 feet, the root chord of the aircraft is approximately 16 feet, the rotor diameter of each rotor is approximately 9 feet, and the sweep angle of the flying wing is approximately 30 degrees.

As shown in FIGS. 1 and 2, each of the forward rotors 106 may be tiltable between a lift configuration for vertical take-off, landing, and hover (shown in FIG. 2) and a propulsion configuration for cruise (shown in FIG. 1). In the lift configuration, the rotors are tilted so that thrust is directed downward to provide lift of the aircraft 100; in the propulsion configuration, the rotors are tilted so that thrust is directed rearward to provide forward thrust of the aircraft 100. In some embodiments, a range of tilt of at least one of the forward rotors 106 may be greater than 90 degrees. For example, each of the forward rotors may be able to tilt from a straight-ahead position in its propulsion configuration to a position just past (for example, less than 10 degrees past) vertical in its lift configuration. The slight rearward tilt may help with aircraft stability and control. Moreover, as shown in FIGS. 1 and 2, each of aft rotors 108 may be fixed such that they can provide lift during vertical take-off and landing but cannot provide forward thrust during cruise. However, alternative embodiments are possible. In these alternative embodiments, the forward rotors, the aft rotors, both the forward rotors and the aft rotors, or neither the forward rotors nor the aft rotors may be tiltable.

Figure 3:
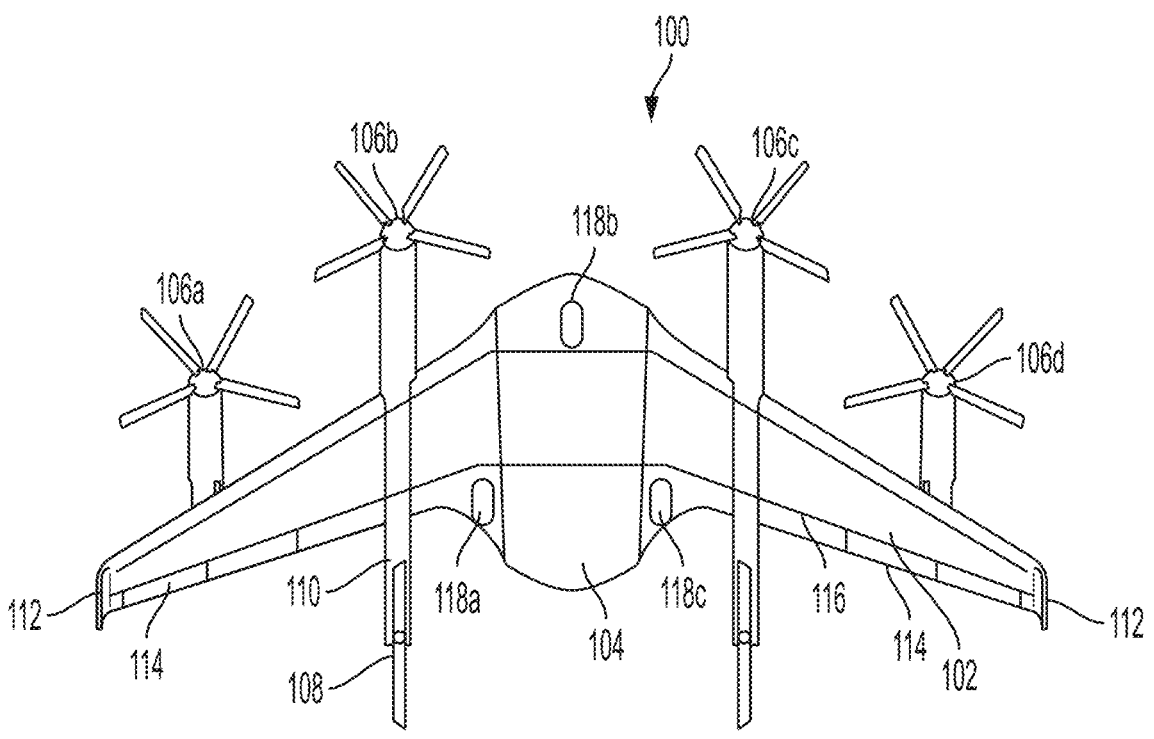
FIG. 3 shows an exemplary structural layout of a VTOL aircraft, according to some embodiments.

FIG. 3, an exemplary structural layout of the underside of aircraft 100 is shown. In particular, FIG. 3 shows that the aircraft comprises wing 102, which in turn comprises passenger compartment 104, wing tips 112, and flaps 114; forward rotors 106 and aft rotors 108 mounted to wing 102 via booms 110; wing box 116 (which is the primary load carrying structure of wing 102); and landing gear wheels 118a-c. Wing 102 is parallel to the ground, and remains parallel to the ground while taking-off, landing, hovering, and cruising. As shown in FIG. 3, the forward rotors 106 may be staggered in the forward-rearward direction such that the plane of rotation of adjacent rotors are non-coplanar. In the illustrated embodiment, the innermost rotors 106b and 106c are forward of rotors 106a and 106d.

In some embodiments, when the aircraft 100 is in full forward flight, each of the aft rotors 108 may be shut-off. The blades of the aft rotors 108 may be locked in low drag positions for aircraft cruising. In some embodiments, the aft rotors 108 each have two blades that are locked for cruising in minimum drag positions in which one blade is directly in front of the other blade, as illustrated in FIG. 3. In some embodiments, the rotors 108 have more than two blades. Further, in some embodiments, the forward rotors 106 include more blades than the aft rotors 108. For example, as illustrated in FIGS. 3, the forward rotors 106 may each include five blades and the aft rotors 108 may each include two blades. According to various embodiments, the forward rotors 106 can have from 2 to 7 blades.

In some embodiments, the forward rotors 106 and the aft rotors 108 are mounted to the wing 102 via booms 110. The booms 110 may be mounted beneath the wing, on top of the wing, and/or may be integrated into the wing profile. As shown in FIG. 3, some of the booms are configured to support one of the forward rotors at a front end of the boom, whereas other booms are configured to support both one of the forward rotors at a front end of the boom and one of the aft rotors at a rear end of the boom. In particular, FIG. 3 shows that those booms adjacent to the passenger compartment 104 are configured to support both one of the forward rotors at a front end of the boom and one of the aft rotors at a rear end of the boom, whereas those booms closer to wing tips 112 are configured to support only one of the forward rotors at a front end of the boom. Thus, more of the weight of the aircraft is located near the center of the aircraft. Moreover, the aircraft may comprise more forward rotors at least so that the center of gravity of the aircraft is forward of the neutral point of the aircraft.

In some embodiments, wing 102 comprises control surfaces. As depicted in FIG. 3, wing 102 may comprise flaps 114. In some embodiments, flaps 114 are rearward of an aft spar of wing 102. The flaps can be used for aircraft maneuvering and stability in a conventional manner. Moreover, as depicted in FIG. 3, wing 102 may comprise winglets 112 for reduced drag and directional control during forward flight.

In some embodiments, landing gear wheels 118*a-c* are arranged in a conventional tricycle layout. In these embodiments, wheels 118*a* and 118*c* are main landing gear wheels and wheel 118*b* is a nose landing gear wheel. Main landing gear wheels 118*a* and 118*c* may interface with a rear spar of wing 102. Nose landing gear wheel 118*b* may interface with a front spar of wing 102 and/or an underside of passenger compartment 104.

Figure 4A:
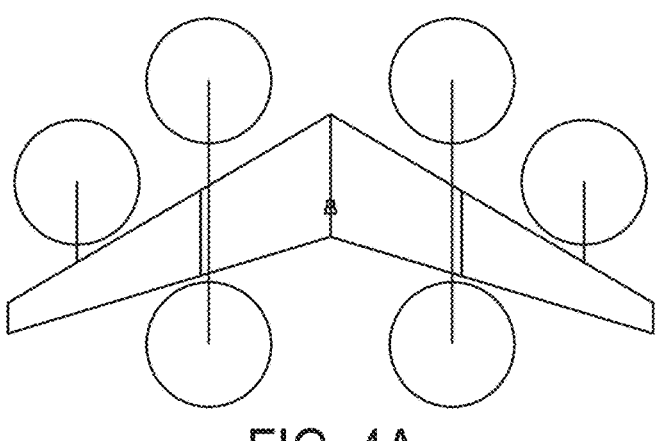
FIGS. 4A-C show exemplary rotor layouts of a VTOL aircraft, according to some embodiments.
Figure 4B:
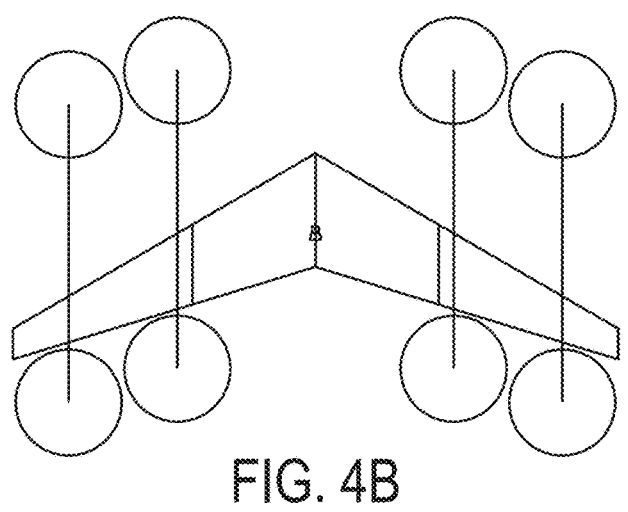
Figure 4C:
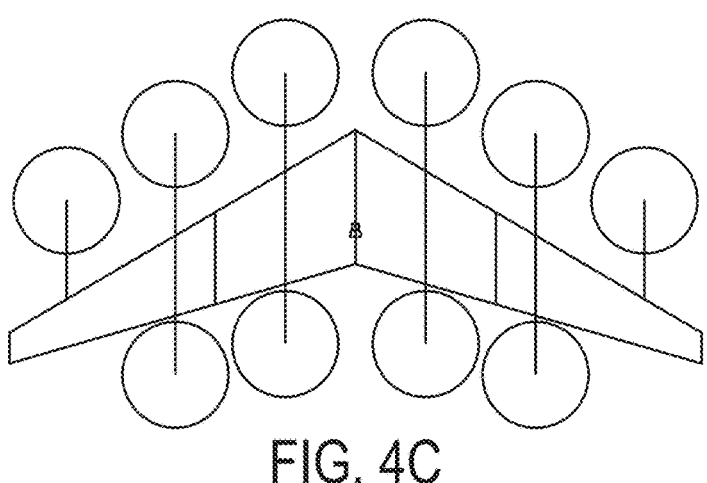

FIGS. 1-3 show an exemplary embodiment in which the aircraft includes six rotors, of which four are forward rotors and two are aft rotors. However, alternative embodiments are possible. FIGS. 4A-C show several possible rotor layouts. Regardless of the rotor layout, the center of gravity of the aircraft is forward of the neutral point of the aircraft. Further, the centroid of the rotors in the hover configuration may be located close to the center of gravity. In some embodiments, the centroid of the rotors in the hover configuration may be within 10% of the quarter chord of the mean aerodynamic chord.

FIG. 4A shows a rotor layout that matches the rotor layout shown in FIGS. 1-3. Specifically, in FIG. 4A, the aircraft includes six rotors, four of which are forward rotors and two of which are aft rotors. Contrastingly, FIGS. 4B and 4C show alternative rotor layouts compared to that shown in FIGS. 1-3. In FIG. 4B, the aircraft includes eight rotors, four of which are forward rotors and four of which are aft rotors. In this eight rotor layout, in order for the centroid of the rotors to be located near the center of gravity and forward of the neutral point, the forward rotors extend significantly farther forward from the leading edge of the wing of the aircraft compared to the forward rotors of the six rotor layout. In FIG. 4C, the aircraft includes ten rotors, six of which are forward rotors and four of which are rear rotors. In this ten rotor layout, the rotors may be closer to each other than they are in the six rotor layout and/or the eight rotor layout so that they are still all positioned between the passenger compartment and the wing tips.

In some embodiments, regardless of the number of rotors, a total lift and thrust required to be provided by the rotors 106 and 108 and a sum of the disc area of the rotors 106 and 108 may be constant. Thus, as the number of rotors attached to wing 102 increases, the size of each rotor may decrease. In some embodiments, the sum of the disc areas of all the rotors 106 and 108 may be least as large as an area of the wing 102. This may advantageously limit the power output required during high power demand operations to a desired range. In some embodiments, a sum of the disc areas of all the rotors should be at least 0.5 times the wing area, or at least 1 times the wing area. In some embodiments, a sum of the disc areas of all the rotors should be at most 2.5 times the wing area or 2 times the wing area. In some embodiments, a sum of the disc areas of all the rotors is preferably approximately 1.5 times the wing area. In some embodiments, the wing area is 250 ft$^2$ to 350 ft$^2$ or about 300 ft$^2$. In some embodiments, the total rotor disk area is 400 ft$^2$ to 500 ft$^2$ or about 450 ft$^2$.

In some embodiments, the six rotor layout may be preferable to the eight rotor layout and the ten rotor layout. The six rotor layout may be preferable at least because the fewer the number of rotors, the greater the flexibility in choosing which rotors are attached to the wing and where the rotors are positioned relative to the other components of the aircraft. Moreover, the six rotor layout may be preferable because the fewer the number of rotors, the easier it is to enter and exit the passenger compartment.

FIGS. 4A-C show exemplary embodiments in which the aircraft includes six rotors, eight rotors, and ten rotors, respectively. However, alternative embodiments are possible. For example, the aircraft may include seven rotors or the aircraft may include twelve rotors. However, the aircraft may need to include at least six rotors so that (1) the aircraft can take-off, land, hover, and cruise as expected; and (2) the aircraft has sufficient redundancy in case of failure conditions.

Turning back to FIGS. 1-3, in some embodiments, the forward rotors 106 and the aft rotors 108 are positioned and configured to minimize the damage that may occur due to blade failure (commonly referred to as rotor burst). As described above with respect to FIG. 3, the forward rotors 106 may be staggered in the forward-rearward direction such that the plane of rotation of the rotors are non-coplanar. In the embodiment illustrated in FIGS. 1-3, the innermost rotors 106*b* and 106*c* are forward of passenger compartment 104 to ensure that a broken blade cannot enter the passenger compartment and injure a passenger and/or pilot or damage a critical control system. While FIG. 3 is shown and described with respect to staggered forward rotors, in some embodiments, at least two rotors on the same side of the aircraft (e.g., the same side with respect to the passenger compartment) may be aligned such that their blade rotation planes are coplanar. Additionally, while not shown in FIG. 3, in some embodiments, the aft rotors may be staggered in the forward-rearward direction.

Moreover, FIGS. 1-3 depict an exemplary embodiment in which rotors are not canted. However, in some alternative embodiments, at least one of the forward rotors 106 and/or at least one of the aft rotors 108 is canted relative to at least one other forward rotor 106 and/or aft rotor 108. As used herein, canting refers to a relative orientation of the rotational axis of the rotor about a line that is parallel to the forward-rearward direction, analogous to the roll degree of freedom of the aircraft. Canting of the rotors can help minimize damage from rotor burst by orienting the rotational plane of the rotor discs (the blades plus the rotor portion onto which the blades are mounted) so as to not intersect critical portions of the aircraft (such areas of the passenger compartment in which people may be positioned, critical flight control systems, batteries, adjacent rotors, etc.)

or other rotor discs and may provide enhanced yaw control during hover flight. In some embodiments, a cant angle of any rotor is such that a respective burst disc will not intersect with passengers or a pilot. In some embodiments, a cant angle of any rotor is such that a respective burst disc will not intersect with any flight-critical component. (As used herein, a critical component is any component whose failure would contribute to or cause a failure condition that would prevent the continued controlled flight and landing of the aircraft.)

The rotation planes of canted rotors are angled relative to horizontal. The rotation plane may be angled relative to horizontal by a cant angle measured from vertical ranging from 0 to 30 degrees. In some embodiments, the cant angle is preferably about 12 degrees. In some embodiments, two adjacent rotors may be canted the same amount but in the opposite direction from each other such that their rotational axes are non-parallel to each other. It will be understood by a person of ordinary skill in the art that any suitable combination of rotor canting (inclusive of no canting) may be used according to the desired performance characteristics of the aircraft.

Figure 5A:
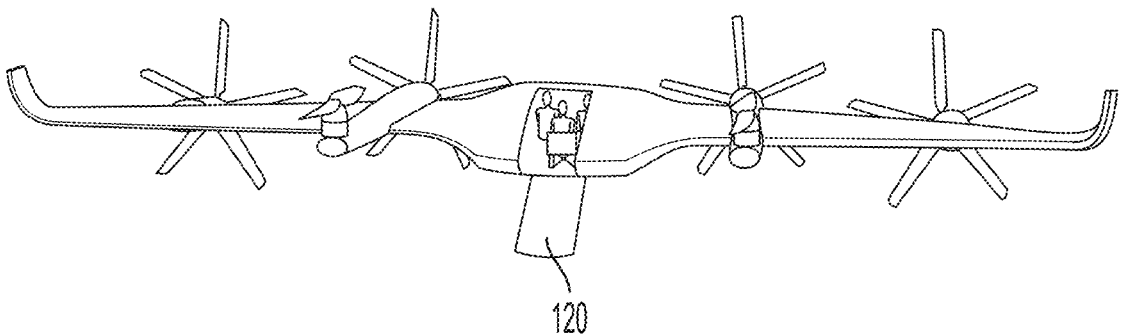
FIGS. 5A-B show exemplary ingress and egress options for entering and exiting a VTOL aircraft, according to some embodiments.
Figure 5B:
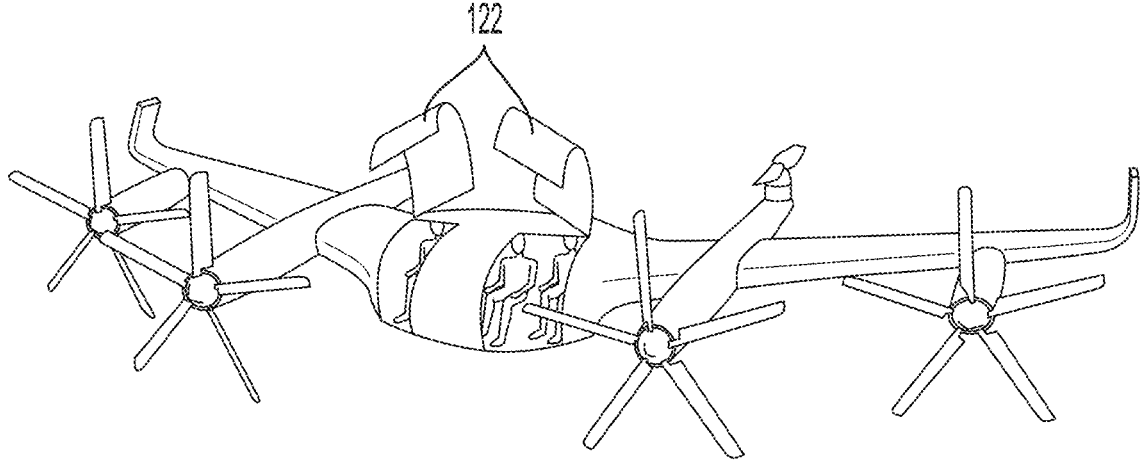

Turning to FIGS. 5A and 5B, several possible ingress and egress options for entering and existing the passenger compartment are shown. In particular, FIG. 5A shows an embodiment in which passengers may enter and exit the passenger compartment via an aft ramp 120 that folds downward so that it can touch the ground when the aircraft is on the ground. FIG. 5B shows an embodiment in which passengers may enter and exit the passenger compartment via a pair of leading edge doors 122 that open outward. Allowing entry and exit via a ramp (e.g., ramp 120) may be advantageous at least to provide increased accessibility to passengers (e.g., for passengers who are in wheelchairs), to provide easier loading of goods into the aircraft, and/or to ensure that the component(s) for ingress and egress do not come near the rotors at any time (which may be particularly important as the number of rotors is increased). Allowing entry and exit via a pair of doors (e.g., doors 122) may be advantageous at least to enable quick ingress and egress (as shown in FIG. 5B, at least two passengers may simultaneously enter or exit the passenger compartment). Moreover, allowing entry and exit via the rear of the passenger compartment may be advantageous to allow easier access to storage behind the seats, simplifying the structure of the wing leading edge, and/or allow more separation of the entrance/exit from the rotors. Allowing entry and exit via the front of the passenger compartment may be advantageous at least to enable passengers to more easily be seated (e.g., the rear of the passenger compartment may be used for storage). While FIGS. 5A and 5B show several exemplary ingress and egress options, alternative options are possible.

Turning to FIGS. 6A-D, several possible seating arrangements within the passenger compartment are shown.

Figures 6A, 6B, 6C, 6D:
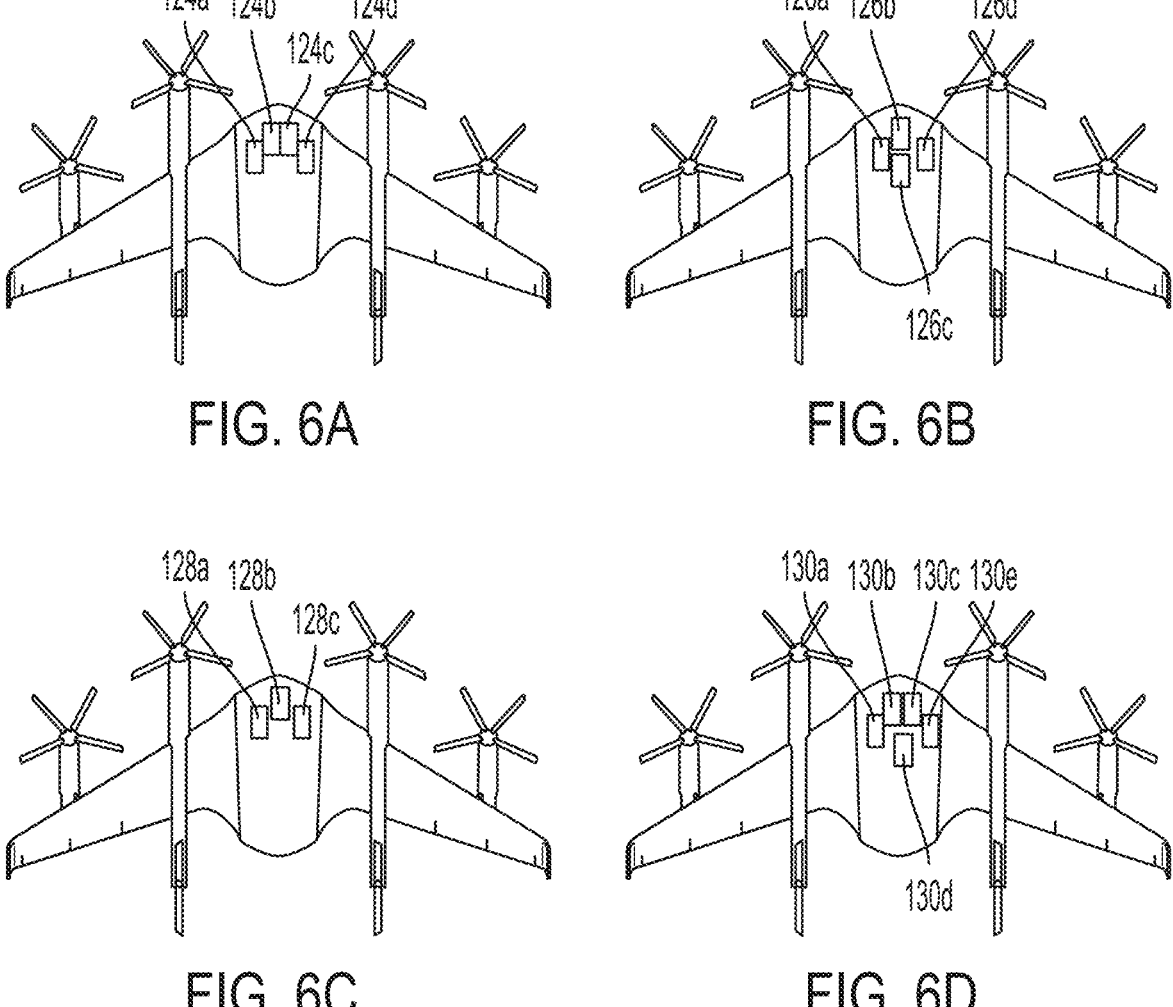
FIGS. 6A-D show exemplary seating arrangements of a VTOL aircraft, according to some embodiments.

FIG. 6A shows an exemplary embodiment in which the passenger compartment comprises four seats 124a-d along the leading edge of the wing of the aircraft. Of the four seats, two (124b and 124c) are middle seats closer to the center of the passenger compartment and two (124a and 124d) are outer seats closer to the left and right sides of the passenger compartment (where left and right are determined based on the top-down view shown in FIG. 6A). As shown in FIG. 6A, the two middle seats are positioned farther forward in the passenger compartment than are the two outer seats. In some embodiments, a pilot may sit in one of the two middle seats.

FIG. 6B shows an exemplary embodiment in which the passenger compartment comprises four seats 126a-d in a diamond configuration. Of the four seats, two (126b and 126c) are middle seats aligned with the center of the passenger compartment and two (126a and 126d) are outer seats closer to the left and right sides of the passenger compartment. Of the two middle seats, seat 126b is positioned in front of seat 126c. In some embodiments, a pilot may sit in the front, middle seat (seat 126b).

FIG. 6C shows an exemplary embodiment in which the passenger compartment comprises three seats 128a-c along the leading edge of the wing of the aircraft. Of the three seats, one (128b) is aligned with the center of the passenger compartment and two (128a and 128c) are outer seats closer to the left and right sides of the passenger compartment. In some embodiments, a pilot may sit in the front, middle seat (seat 128b).

FIG. 6D shows an exemplary embodiment in which the passenger compartment comprises five seats 130a-e. Of the five seats, four (seats 130a, 130b, 130c, and 130e) are positioned along the leading edge of the wing of the aircraft and one (seat 130d) is positioned rearward of the leading edge of the wing. Moreover, three seats (seats 130b-d) are positioned near the center of the passenger compartment and two seats (seats 130a and 130e) are positioned near the left and right sides of the passenger compartment. In some embodiments, a pilot may sit in either of the front, middle seats (seats 130b and 130c).

While several possible seating arrangements have been shown and described with respect to FIGS. 6A-D, alternative arrangements are possible. For example, the seats may be rearranged within the passenger compartment. Moreover, the volume of the passenger compartment may be increased or reduced based on the desired number of passengers to transport. For example, the aircraft may be designed to carry up to six people or up to ten people. Further, in some embodiments, the aircraft may be configured to be piloted, and in other embodiments, the aircraft may be configured to be operated autonomously without any onboard pilot.

Figure 7A:
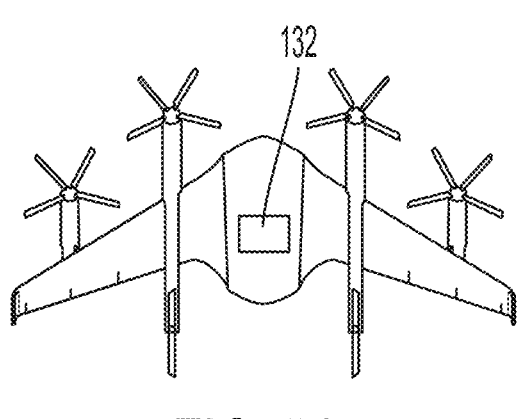
FIGS. 7A-B show exemplary battery locations of a VTOL aircraft, according to some embodiments.
Figure 7B:
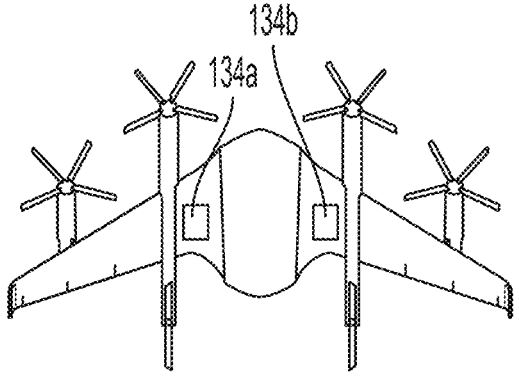

In some embodiments, all the rotors of the aircraft are electrically powered. Batteries for powering the rotors can be located in any suitable locations of the aircraft. FIGS. 7A and 7B illustrate two exemplary embodiments. FIG. 7A shows an embodiment in which the batteries are stored in a housing 132 positioned in an aft section of the centerbody. FIG. 7B shows an embodiment in which the batteries are stored in two housings 134a and 134b that are each positioned along the wing roots adjacent to the passenger compartment. In some embodiments, the batteries may be configured to provide 50 to 150 kilowatt hours of energy to the rotors. In some embodiments, the batteries may be configured to provide approximately 300 to 400 kilowatt hours of energy. In some embodiments, the batteries may be configured to provide approximately 100 kilowatt hours of energy to the rotors. In some embodiments, a total volume of the space occupied by the batteries may be 0.5 to 1 cubic meter.

In some embodiments, the number and power of the rotors of the aircraft can be selected according to desired performance parameters (e.g., target payload, airspeed, and altitude). In some embodiments, the maximum power rating of one or more of the rotors is 500 kilowatts or less, preferably 200 kilowatts or less, more preferably 150 kilowatts or less. In some embodiments, the maximum power rating of one or more of the rotors is at least 10 kilowatts, preferably at least 20 kilowatts, more preferably, at least 50 kilowatts. As described above, there can be as little as four forward rotors (two on each side of the aircraft) and as little as two aft rotors (one on each side of the aircraft). The aircraft can have an equal number of forward rotors and aft rotors, a greater number of forward rotors, or a greater number of aft rotors.

In some embodiments, the aircraft is configured to carry up to six people (for example, a pilot and up to five passengers) up to 75 miles at a cruising speed of up to 150 miles per hour at an altitude of up to 3,000 feet above ground. In some embodiments, the maximum range on a single battery charge is 25 miles, 50 miles, 75 miles, 100 miles, or 200 miles.

In some embodiments, the rotors are configured to have relatively low tip speed to decrease the amount of noise generated by the aircraft. In some embodiments, the tip speed of the rotor blades is about 0.4 Mach in hover.

In some embodiments, the aircraft is operated during take-off and landing by positioning the forward rotors in lift configurations and providing the required lift to the aircraft via the combined lift provided by the forward rotors and the aft rotors. In some embodiments, during vertical take-off and landing and/or hover, the forward rotors can be maintained in predetermined lift configurations that can be the same across all of the forward rotors or different for different forward rotors. In some embodiments, the tilt of at least some of the forward rotors can be actively adjusted during take-off and landing and/or hover to provide the required stability and/or maneuvering. In some embodiments, the tilt of at least one of the forward rotors is actively controlled by a flight controller during take-off, landing, and/or hover to generate yawing moments.

In some embodiments, each of the forward rotors and/or each of the aft rotors can be individually controlled by the flight controller according to the various operational degrees of freedom. In some embodiments, the only degree of freedom of the aft rotors is the rotational speed of the rotor. In some embodiments, the angle of attack of the blades of the aft rotors can be collectively adjusted, providing an additional degree of freedom. In some embodiments, the degrees of freedom of at least a portion of the forward rotors includes the rotational speed of the forward rotors, the collective attack angle of the blades, and the degree of tilt of the forward rotors. In some embodiments, any of these degrees of freedom can be actively controlled by the flight controller (either autonomously or in response to pilot commands) during take-off and landing in order to provide the appropriate stability and maneuvering.

Once the aircraft has achieved sufficient altitude to commence forward flight, the forward rotors may begin tilting forward toward their propulsion configurations such that their thrust provides a combination of lift and thrust, with a decreasing proportion of lift as the forward rotors are tilted further toward their propulsion configurations. The aft rotors can remain active during at least a portion of the period in which the forward rotors are tilted forward to continue to provide lift. At any point after the forward airspeed is high enough that the wings provide sufficient lift to maintain the aircraft's altitude, the aft rotors can be deactivated. As discussed above, the rotor blades can be locked in a low-drag position.

During cruising, the aft rotors may remain deactivated. The control surfaces of the wings can be used for aircraft maneuvering and stability. In some embodiments, the tilt of at least some of the forward rotors can be actively controlled to provide additional stability and/or maneuverability control. In some embodiments, the tilt of at least some of the forward rotors is actively controlled during take-off and landing and/or hover. In some embodiments, the tilt of the forward rotors is fixed (i.e., non-varying) during cruise. According to some embodiments, the tilt of the outermost forward rotors can be actively and independently controlled during vertical take-off and landing and/or hover to provide yawing moments as needed.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A flying wing vertical take-off and landing aircraft comprising:
    a flying wing comprising a passenger compartment;
    at least four tiltable rotors positioned at least partially forward of a leading edge of the flying wing;
    at least two non-tiltable rotors positioned at least partially rearward of a trailing edge of the flying wing, wherein a number of non-tiltable rotors of the aircraft is less than a number of tiltable rotors of the aircraft;
    a first set of booms mounted to the flying wing, each boom of the first set of booms supporting one of the at least four tiltable rotors and one of the at least two non-tiltable rotors; and
    a second set of booms mounted in a fixed position to the flying wing inwardly of wing tips of the flying wing, each boom of the second set of booms supporting only one rotor, the one rotor being one of the at least four tiltable rotors, wherein for each boom of the second set of booms, a rear end of the boom is mounted to the flying wing such that the boom extends only forward of the flying wing and the tiltable rotor that is supported by the boom is tiltably mounted to a forward portion of the boom at a tilt axis that is spaced forward of the leading edge of the flying wing.

2. The aircraft of claim 1, wherein each of the at least two non-tiltable rotors positioned at least partially rearward of the trailing edge of the flying wing is configured to provide lift for vertical take-off and landing of the aircraft.

3. The aircraft of claim 1, comprising a control system configured to independently alter a tilt of at least one of the at least four tiltable rotors positioned at least partially forward of the leading edge of the flying wing.

4. The aircraft of claim 1, wherein:
    each of the at least four tiltable rotors positioned at least partially forward of the leading edge of the flying wing is configured to provide lift for vertical take-off and landing of the aircraft;
    each of the at least two non-tiltable rotors positioned at least partially rearward of the trailing edge of the flying wing is configured to provide lift for vertical take-off and landing of the aircraft; and

13 the aircraft comprises a pusher motor positioned at least partially rearward of a center section of the trailing edge of the flying wing to provide forward thrust to the aircraft.

5. The aircraft of claim 1, wherein a first rotor of the at least four tiltable rotors or the at least two non-tiltable rotors canted relative to a second rotor of the at least four tiltable rotors or the at least two non-tiltable rotors such that a rotational axis of the first rotor is non-parallel with a rotational axis of the second rotor.

6. The aircraft of claim 1, wherein a sweep angle of the flying wing is at least 20 degrees.

7. The aircraft of claim 6, wherein the sweep angle of the flying wing is 20 to 40 degrees.

8. The aircraft of claim 1, wherein a sum of disc area of the rotors of the aircraft is at least the wing area of the flying wing.

9. The aircraft of claim 1, wherein the aircraft has six rotors connected to the flying wing.

10. The aircraft of claim 1, wherein the aircraft has ten rotors connected to the flying wing.

11. The aircraft of claim 1, wherein the flying wing has winglets.

12. The aircraft of claim 1, wherein the aircraft is electrically powered.

13. The aircraft of claim 1, wherein a distance from the leading edge of the flying wing to each center of each of the at least four tiltable rotors positioned at least partially forward of the leading edge of the flying wing is less than 2 rotor radii.

14. The aircraft of claim 1, wherein a distance from the trailing edge of the flying wing to each center of each of the at least two non-tiltable rotors positioned at least partially rearward of the trailing edge of the flying wing is 0.5 to 2 rotor radii.

15. The aircraft of claim 1, comprising at least one door at the leading edge for passenger ingress and egress.

16. The aircraft of claim 15, comprising at least two doors at the leading edge for passenger ingress and egress.

17. The aircraft of claim 1, comprising at least one ramp at the trailing edge for passenger ingress and egress.

18. The aircraft of claim 1, comprising at least two seats positioned adjacent to each other in a width direction of the aircraft.

19. The aircraft of claim 1, wherein the second set of booms are outward of the first set of booms.

20. The aircraft of claim 19, wherein the first set of booms comprises at least four booms.

21. The aircraft of claim 1, wherein a span of the flying wing is 30 to 80 feet, a root chord of the flying wing is 10 to 25 feet, and a rotor diameter of each of the tiltable and non-tiltable rotors is 7-12 feet such that a sum of disc areas of all the tiltable and non-tiltable rotors is 1 to 2.5 times a wing area of the flying wing.

22. The aircraft of claim 1, wherein the first set of booms comprises at least two booms.

23. The aircraft of claim 1, wherein the first set of booms comprises at least four booms.

24. The aircraft of claim 1, wherein the second set of booms comprises at least two booms.

25. A flying wing aircraft comprising:
a flying wing;
a plurality of rotors comprising rotors positioned at least partially forward of a leading edge of the flying wing, and rotors positioned at least partially rearward of a trailing edge of the flying wing, wherein the rotors positioned at least partially forward of the leading edge of the flying wing are tiltable, and a number of the rotors positioned at least partially forward of the flying wing is greater than a number of the rotors position at least partially rearward of the flying wing; and
a plurality of booms mounted to the flying wing, the plurality of booms comprising:
at least one boom that supports only one rotor, the one rotor being one of the rotors positioned at least partially forward of the leading edge of the flying wing, wherein a rear end of a respective boom of the at least one boom that supports only one rotor is mounted in a fixed position to the flying wing inwardly of a respective wing tip of the flying wing such that the respective boom extends only forward of the flying wing, and wherein the rotor that is supported by the respective boom is tiltably mounted to a forward portion of the respective boom at a tilt axis that is spaced forward of the leading edge of the flying wing.

26. The aircraft of claim 25, comprising a control system configured to independently alter a tilt of each of the rotors positioned at least partially forward of the flying wing.

27. The aircraft of claim 25, wherein a first rotor of the plurality of rotors is canted relative to a second rotor of the plurality of rotors such that a rotational axis of the first rotor is non-parallel with a rotational axis of the second rotor.

28. The aircraft of claim 25, wherein a sum of disc areas of the plurality of rotors is at least the wing area of the flying wing.

29. The aircraft of claim 25, wherein the aircraft has six rotors.

30. The aircraft of claim 25, wherein the aircraft has ten rotors.

31. The aircraft of claim 25, wherein a distance from the leading edge of the flying wing to a center of each of the rotors is less than 2 rotor radii.

32. The aircraft of claim 25, wherein a distance from each of the rotors positioned at least partially forward of a leading edge of the flying wing to a corresponding portion of the flying wing is 0.5 to 2 rotor radii.

33. The aircraft of claim 25, wherein the plurality of booms comprises at least one boom that supports one rotor positioned at least partially forward of the leading edge of the flying wing and one rotor positioned at least partially rearward of the leading edge of the flying wing.

34. The aircraft of claim 33, wherein the at least one boom that supports only one rotor is outward of the at least one boom that supports one rotor positioned at least partially forward of the leading edge of the flying wing and one rotor positioned at least partially rearward of the leading edge of the flying wing.

35. The aircraft of claim 25, wherein a span of the flying wing is 30 to 80 feet, a root chord of the flying wing is 10 to 25 feet, and a rotor diameter of each of the rotors is 7-12 feet such that a sum of disc areas of all the rotors is 1 to 2.5 times a wing area of the flying wing.

36. The aircraft of claim 25, wherein the plurality of booms comprises at least four booms.

37. The aircraft of claim 25, wherein the plurality of booms comprises at least six booms.

38. The aircraft of claim 25, wherein the plurality of booms comprises at least two booms that support only one rotor and at least two booms that support only two rotors.

39. The aircraft of claim 38, wherein the at least two booms that support only two rotors comprises at least four booms.

40. A method comprising:

positioning a plurality of tiltable rotors of a flying wing aircraft in a vertical orientation and operating the plurality of tiltable rotors and a plurality of non-tiltable rotors for vertical takeoff or hover, wherein a number of non-tiltable rotors is less than a number of tiltable rotors, the tiltable rotors are positioned at least partially forward of a leading edge of a flying wing, and the non-tiltable rotors are positioned at least partially rearward of a trailing edge of the flying wing, and wherein the plurality of tiltable rotors and plurality of non-tiltable rotors are supported by a plurality of booms that include at least one boom that supports only one rotor, the one rotor being one of the tiltable rotors, wherein a rear end of a respective boom of the at least one boom that supports only one rotor is mounted in a fixed position to the flying wing inwardly of a respective wing tip of the flying wing such that the respective boom extends only forward of the flying wing, and wherein the tiltable rotor that is supported by the respective boom is tiltably mounted to a forward portion of the respective boom at a tilt axis that is spaced forward of the leading edge of the flying wing; and adjusting tilts of the plurality of tiltable rotors to transition to a cruise configuration.

41. The method of claim 40, comprising deactivating the non-tiltable rotors when a forward airspeed of the aircraft is sufficiently high that wings of the aircraft provide sufficient lift to maintain an altitude of the aircraft.

\* \* \* \* \*